Jan. 31, 1956  A. HORNER ET AL  2,732,956
APPARATUS FOR HANDLING CANS
Filed Sept. 8, 1950  3 Sheets-Sheet 3

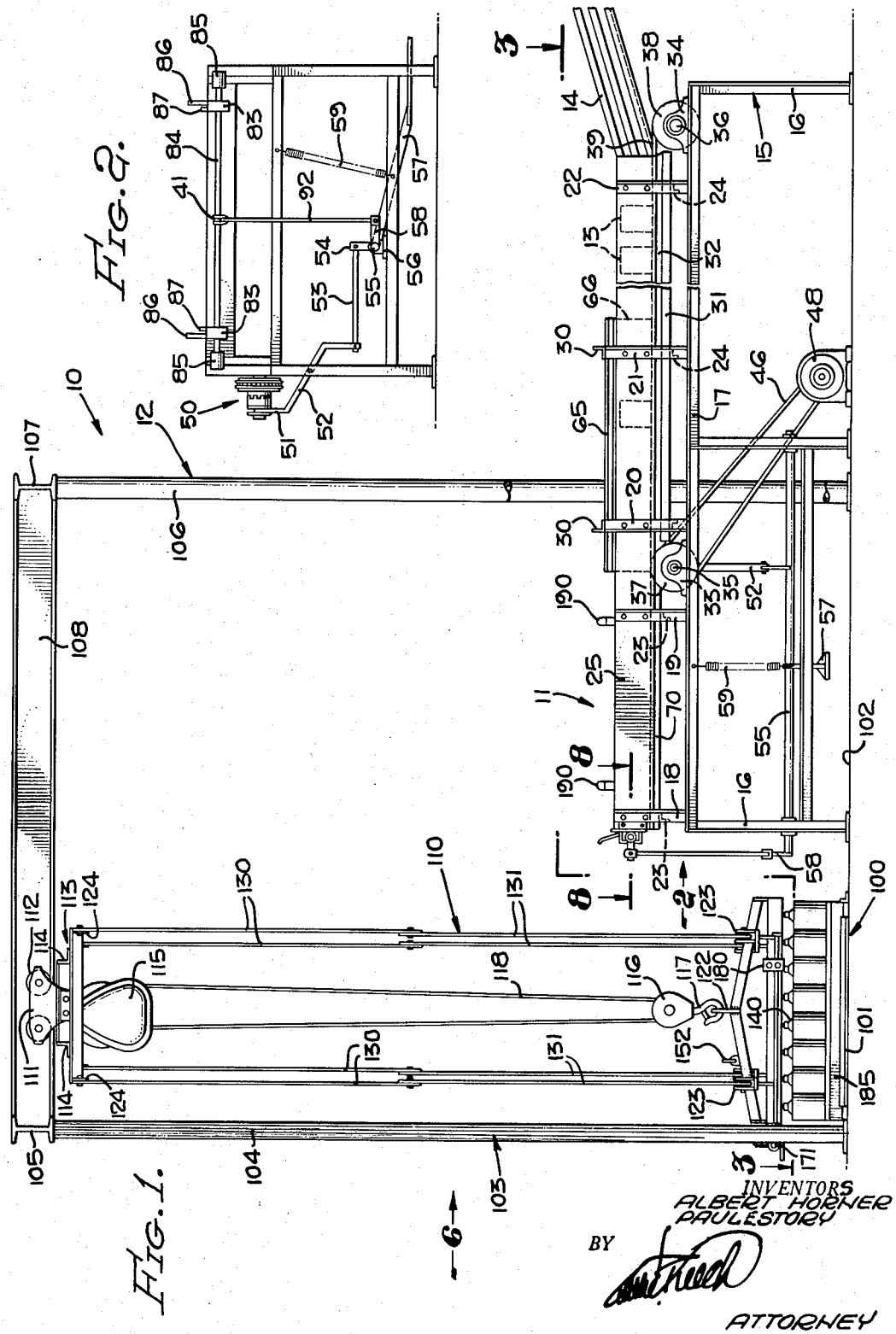

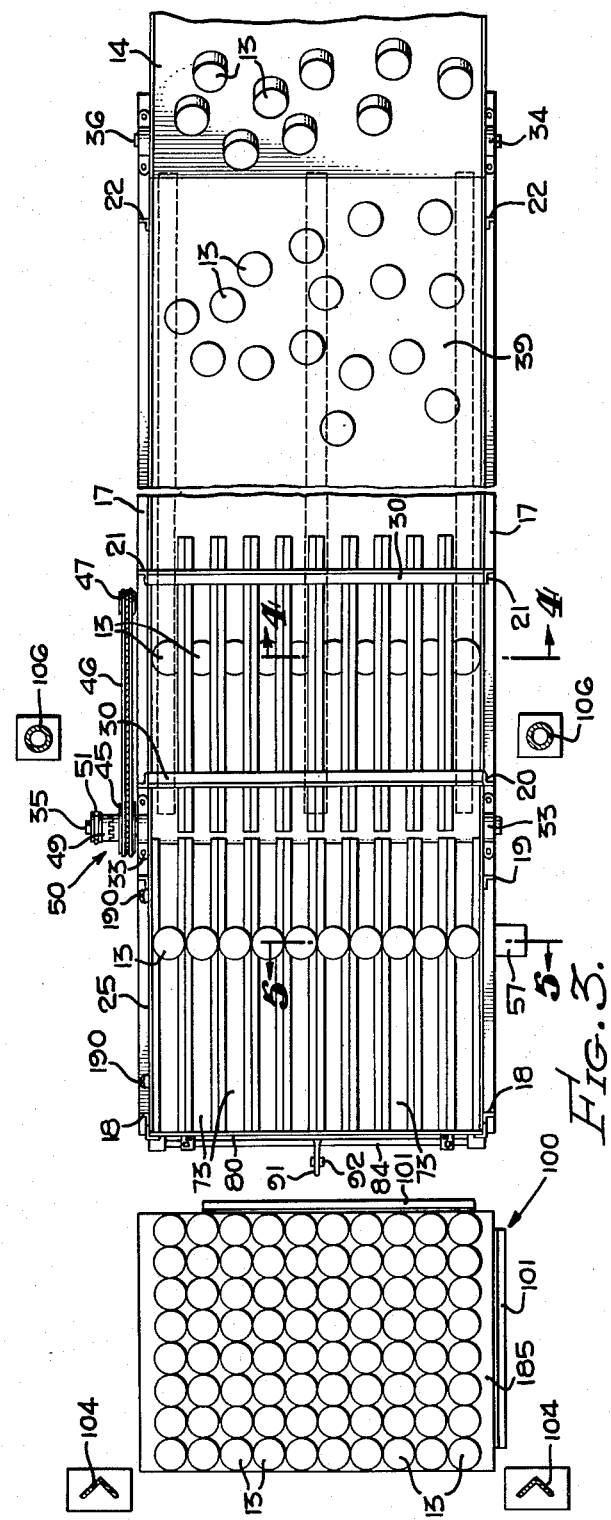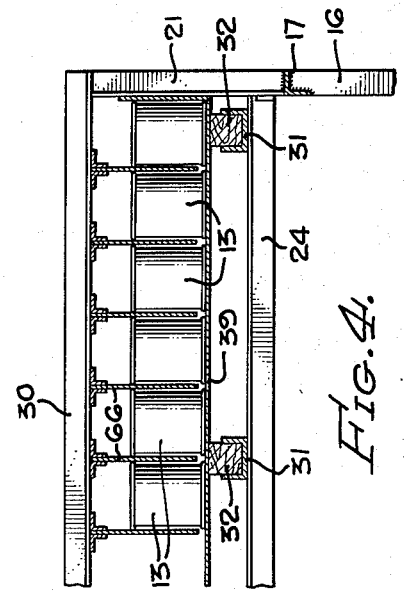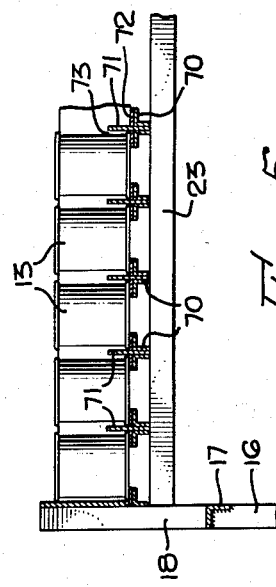

INVENTORS
ALBERT HORNER
PAUL E. STORY
BY
ATTORNEY

United States Patent Office 2,732,956
Patented Jan. 31, 1956

2,732,956
APPARATUS FOR HANDLING CANS

Albert Horner and Paul E. Story, Kapaa, Kauai, Territory of Hawaii, assignors to Hawaiian Canneries Company, Limited, Kapaa, Territory of Hawaii, a corporation of the Territory of Hawaii Application September 8, 1950, Serial No. 183,692

21 Claims. (Cl. 214—1)

This invention relates to the handling of cans in large quantities in canneries and warehouses and is particularly useful in stacking cans on pallets for storage and unstacking the same when removing said cans from storage.

It is common practice in the canneries to put up food products in cans, close the same and then store these cans in relatively large quantities before applying labels to the cans. The cans are then removed from storage and labeled as needed in making up orders for shipment. In some cases the unlabeled cans of product are shipped to distant warehouses where they are labeled as needed for making deliveries to market outlets. Various methods have been used in the past in handling these unlabeled, filled cans but each of these has required the use of a considerable amount of labor.

The present invention is an improvement over the Method and Apparatus for Handling and Storing Containers disclosed in the co-pending application of Albert Horner, Serial 148,630, filed March 9, 1950. That invention provided a simple method and apparatus of collecting cans on a platform as these were delivered filled and closed from the end of a processing machine and facilitating the manual delivery of the cans from this platform on to a pallet to form successive tiers thereon separated by sheets of kraft paper.

It is an object of this invention to provide a method and apparatus for handling filled and closed cans in this same situation which will mechanize this so completely that the palletizing of cans can be accomplished by a single relatively unskilled operator.

The manner of accomplishing the foregoing object, as well as further objects and advantages, will be made evident in the following description taken in connection with the accompanying drawings.

Fig. 1 is a diagrammatic side elevational view of a preferred form of the apparatus of the invention.

Fig. 2 is an end elevational view of the can accumulator of the invention taken in the direction of the arrow 2 in Fig. 1.

Fig. 3 is a horizontal sectional view taken on the line 3—3 of Fig. 1.

Fig. 4 is a transverse fragmentary enlarged sectional view taken on the line 4—4 of Fig. 3.

Fig. 5 is a view similar to Fig. 4 taken on the line 5—5 of Fig. 3.

Figure 6:
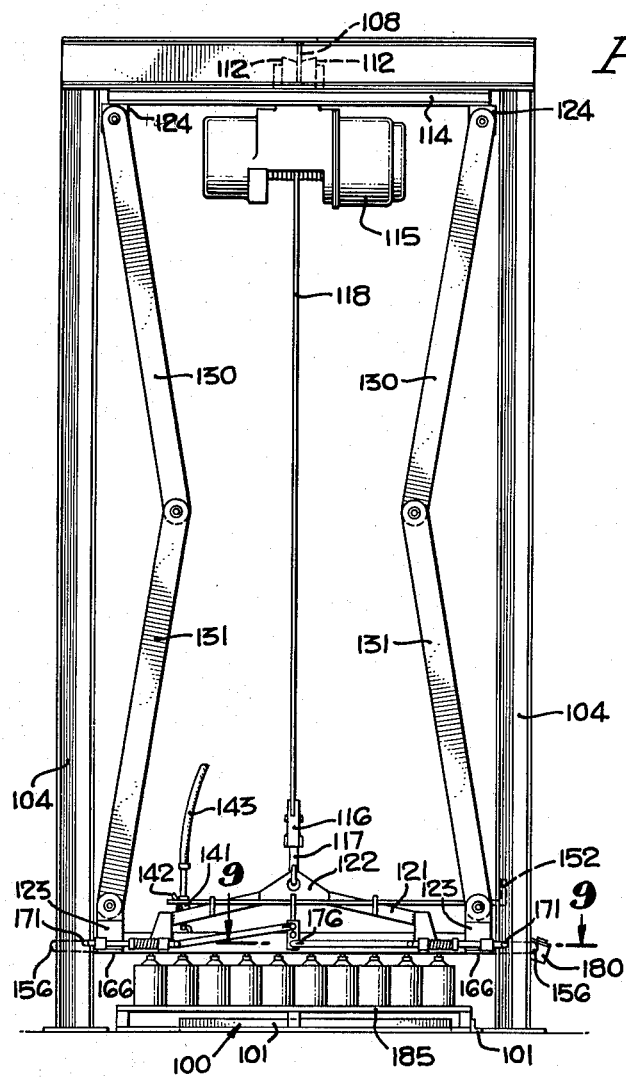
Fig. 6 is an end elevational view of the pallet loader of the invention taken in the direction of the arrow 6 in Fig. 1.

The apparatus of the invention as diagrammatically shown in the drawings for illustrative purposes is generally designated by the numeral 10 and includes a can accumulator 11 and a pallet loader 12.

The can accumulator is positioned to receive filled and closed cans 13 from a chute 14 onto which the cans are delivered by a processing machine (not shown). The accumulator 11 is mounted on a frame 15 including legs 16 and a rectangular upper structure 17, from which short uprights 18, 19, 20, 21 and 22 extend upwardly along the sides of the accumulator 11. Corresponding uprights 18 and 19 on opposite sides of the accumulator are connected by angle irons 23, while corresponding uprights 20, 21 and 22 are connected by angle irons 24. Secured to the inner faces of all of these uprights on opposite sides of the accumulator 11 are sheet metal side walls 25.

Connecting upper ends of the uprights 20 and 21 are angle irons 30. Supported on angle irons 24 are three channel irons 31 carrying wooden runners 32. Provided on the upper frame structure 17 are bearings 33 and 34 in which shafts 35 and 36 journal. These shafts carry conveyor rollers 37 and 38 on which an endless belt 39 is trained so that the upper flight thereof slides over ends supported by the wooden runners 32. The belt 39 may be of any suitable material but is preferably formed of stainless steel of approximately 14 gauge.

Freely rotatable on the far end of shaft 35 is a sprocket 45 having a toothed clutch face on the outer end of the hub thereof, this sprocket being driven by chain 46, which connects it with a pinion sprocket 47 on a power source such as a geared motor 48. Splined on the outer end of the shaft 35 is a clutch collar 49 which unites with the toothed hub of the sprocket 45 to form a clutch 50. The clutch 50 is adapted to be controlled by a yoke 51 provided on the upper end of a lever 52, the lower end of which is connected by a link 53 with an arm 54 formed on a shaft 55 which journals in bearings 56 provided on the frame 15. Shaft 56 has a foot pedal 57 for rotating said shaft and an arm 58, the purpose of which will be made clear hereinafter. Clutch 37 is maintained normally engaged by spring 59, which is connected to the frame 15 and the pedal 57 in order to yieldingly hold the latter in an upward position.

Supported by the pairs of angle irons 65 secured to the bottom faces of the angle irons 30 are depending can guiding plates 66 which are preferably made of stainless steel of approximately 20 gauge thickness. The lower edges of these guides are spaced upwardly from the upper flight of conveyor belt 39 as shown in Fig. 4 and are spaced at equal intervals just sufficient to receive the cans 13 therebetween.

Figure 7:
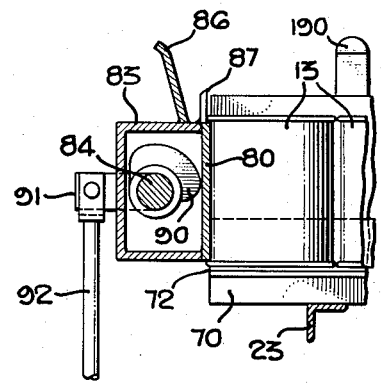
Fig. 7 is an enlarged detailed sectional view taken on the line 7—7 of Fig. 8.
Figure 8:
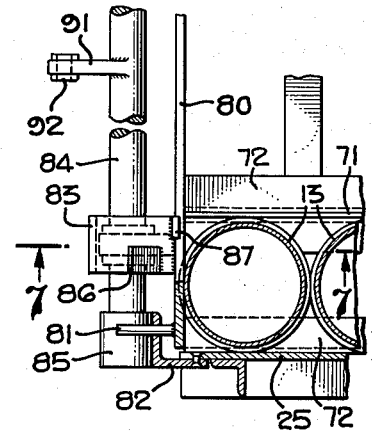
Fig. 8 is an enlarged detailed sectional view taken on the line 8—8 of Fig. 1.

Fixed on angle irons 23 as shown on Fig. 5 are pairs of angle irons 70 between which are mounted vertical can guide vanes 71 which are preferably formed of stainless steel of approximately 20 gauge thickness. The upwardly disposed faces of the angle irons 70 are shod with wear plates 72 which are also preferably formed of stainless steel. The guide vanes 71 are in alignment with the depending guide plates 66 and the wear plates 72 are located just below the level of the upper face of the upper run of conveyor belt 39 so that cans 13 traveling on said belt between the guides 66 are delivered at the end of this belt directly into the guide ways 73 formed between the vanes 71. As additional cans are delivered from the belt 39 into the guide ways 73 the loader becomes progressively filled with cans until the endmost cans in the guide ways 73 form a row directly across the accumulator 11 and in contact with an end wall 80 as shown in Figs. 7 and 8.

This end wall is mounted for controlled horizontal movement by provision of pins 81 extending outwardly from opposite ends thereof so that these pins slide in suitable holes provided in angle-iron sections 82 which are fixed on adjacent ends of the side walls 25. Wall 80 also has welded thereto a pair of cam boxes 83 through which a cam shaft 84 extends, the latter journaling at its opposite ends in bearings 85 provided on the angle iron sections 82. Fingers 86 and 87 extend upwardly from cam boxes 83 for a purpose which will be made clear hereinafter. The shaft 84 carries cams 90 which operate to shift the end wall 80 horizontally when the cam shaft 84 is rotated. Extending outwardly from shaft 84 is an arm 91 which is connected by a link 92 to the arm 58 on shaft 55 as shown in Fig. 2.

The pallet loader 12 includes a pallet jig 100 formed by angle irons 101 secured by the floor 102 on which the apparatus 10 is mounted, this jig being at the left end of and in longitudinal alignment with the can accumulator 11. The pallet loader also includes a four-legged superstructure 103, including a pair of angle iron legs 104 connected at their upper ends by an I-beam 105, tubular legs 106 connected by an I-beam 107, an I-beam track 108, which is welded at its opposite ends to I-beams 105 and 107 and which is in vertical longitudinal alignment with the can accumulator 11 and the pallet jig 100.

Supported on the overhead track 108 is a traveling can tier lifter 110 which includes a wheeled truck 111, wheels 112 of which ride on the lower flanges of the track 108 and which carries a head frame 113 including beams 114 and on which is mounted an electrically driven lifting hoist 115 which may be electrically controlled to lift or lower a block 116 having a hook 117, the block being connected to the hoist by a cable 118.

The can tier lifter 110 operates on the vacuum principle and follows in general the construction of the similar vacuum can lifter disclosed in the above noted co-pending Horner application. It includes a rectangular frame 120 which is preferably formed of angle iron. This frame has four bars 121 welded thereto near the corners thereof which unite centrally at a point over the center of gravity of lifter 110 in an apertured plate 122 which is engaged as shown in Figs. 1 and 6 by the hook 117.

Near its corners, the frame 120 is provided with bearings 123 which are in vertical alignment with similar bearings 124 provided at the four corners of the head frame 113. Pivotally suspended from the bearings 124 are four links 130, the lower ends of these links being pivotally connected with the upper ends of similar links 131, the lower ends of which pivotally connect with the bearings 123. The links 130 and 131 are of such length that when the lifter 110 is in its lowest position, these links are angled relative to each other as shown in Fig. 6, thus they may not be extended to dead center. The function of these pairs of links is to relate the frame 120 to the head frame 113 so these frames will be relatively non-rotatable relative to each other and so that the entire lifter 110 may be readily shifted along the track 108 by pulling in the same direction on the frame 120.

Frame 120 has a multiplicity of vacuum cups 140 supported thereon in a manner similar to that disclosed in the co-pending Horner application, these cups all being connected by pipes mounted on said frame leading to a 3-way valve 141 having an operating lever 142 and through which air contained in said cups may be evacuated by means of a suction hose 143 which connects with said valve (Fig. 6).

Provided on two of the bars 12 are bearings 150 in which a control rod 151 slides. This rod has a handle 152 for operating the same and two eyes 153 and 154 formed at and near its opposite end. The eye 154 receives the upwardly extnding operating arm 142 of the vacuum valve 141.

Figure 9:
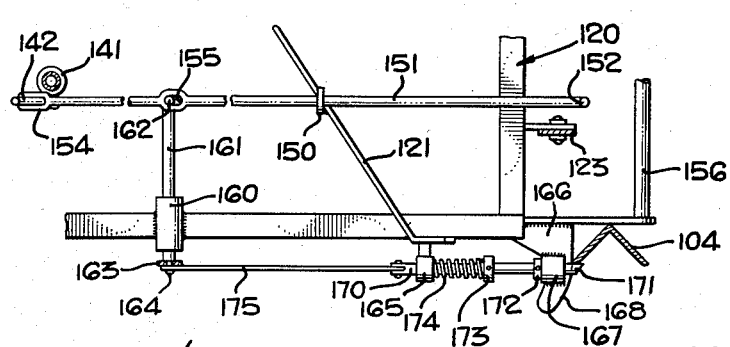
Fig. 9 is an enlarged fragmentary sectional detail view taken on the line 9—9 of Fig. 6.

The frame 120 has U-shaped handles 156 provided on opposite ends thereof. Besides assisting in the manipulation of the lifter 110, these handles provide end stops for engaging the angle-iron posts 104 as shown in Fig. 9 when said lifter is moved into vertical alignment with the pallet jig 100. Journaled in a bearing 160 provided on the frame 120 is a short shaft 161 having a radial arm 162 which extends upwardly through the eye 155. Fixed upon the outwardly extending end of the shaft 161 is a cross-bar 163 which is normally disposed vertically as shown in Fig. 6 and which has pins 164 provided in its upper and lower ends.

Secured as by welding to the frame 120, at each of the near corners thereof, as this frame is viewed in Fig. 6, is a bearing 165 and a guide plate 166 having thereon a bearing 167 which is aligned with bearing 165 and which has a cam face 168, the purpose of which will be made clear hereinafter. Slidable in the bearings 165 and 167 is a latch rod 170 having a bevelled outer end 171 and carrying a stop collar 172 and a spring retaining collar 173, a compression spring 174 being coiled about rod 170 between the bearing 165 and collar 173 to yieldably hold collar 172 against bearing 167. The inner end of each of the rods 170 is bifurcated to pivotally receive one end of a link 175, the opposite end of which link has a slot 176 which receives one of the pins 164 on the cross-bar 163.

Mounted on the handle 156 near the station occupied by the operator is a push-button switch 180 for controlling the hoist 115.

*Operation*

The use of apparatus 10 in performing the method of this invention starts with the electric motor 48 being energized to cause the upper flight of conveyor belt 39 to travel continuously towards the left as seen in Fig. 1; with the electrical circuit of the overhead hoist 115 energized so this may be operated to lift or lower the can lifter 110 by a selective pressing of the buttons on the switch 180; with the hose 143 connected with a vacuum tank; with an empty pallet 185 placed on the floor 102 against the angles 101 of pallet jig 100; and with cans 13 traveling in upright position down the slide chute 14 onto the lefthand end of conveyer belt 39.

As the cans travel leftward on the conveyer 39, they come into engagement with and are aligned by the depending guide plates 66 so as to pass between the latter in straight rows which are aligned respectively with the guide ways 73 formed between the guide vanes 71. The cans continue to be delivered to the guide ways 73 until each of these has received a total of eight cans, with the endmost can in each guide way engaging the end wall 80.

At the start of operations, the operator pulls on the handle 152 so as to swing the valve arm 142 thus shutting off the vacuum cups 140 from the suction hose 143 and opening these cups to the atmosphere. The same movement of rod 151 swings arm 162 forwardly thus withdrawing the latch rods 170 from behind the angle posts 104. The lifter 110 is thus released from its connection with these posts and if it is already elevated to a level from which it can be moved horizontally over the accumulator 11, the operator merely pulls to the right on the handle 156 which causes the lifter 110 to roll along over the overhead rail 108 until it has reached a point where it is directly above the cans accumulated in the guide ways 73 of the accumulator 11.

The lifter 110 is manually halted in this position, the operator pressing the lowering button on switch 180 while doing so to start lowering the lifter 110 and at the same time depresses the foot pedal 57. The first part of the latter movement opens the clutch 50, thereby stopping the conveyer 39 and halting the delivery of cans 13 from the discharge end thereof. The balance of the downward movement of pedal 57 shifts the end wall 80 away from the endmost row of cans 13, thereby freeing this row and all the cans in the guide way 73 from compression between wall 80 and the cans on the halted conveyer 39 which rest against the cans 13 at the opposite ends of guide way 73 from the wall 80. The cans in the guide way 73 are now free to be lifted by the lifter 110 and the operator manually controls the descent of the latter so that one side member of the lifter frame 120 descends between the fingers 86 and 87 while the frame member positioned away from the operator is allowed to descend just within a pair of fingers 190 which are provided on the back wall 25 of the accumulator 11.

The lifter is thus guided in its descent so that one of the vacuum cups 140 is pressed against the top of each of the cans 13 in the tier pattern formed in the guide ways 73. The operator now pushes on the handle 152, thereby operating the valve 141 to reconnect the vacuum cups 140 with the suction hose 143, causing each of these cups to grip the can top against which it is pressed. The operator then presses the proper button on switch 180 to cause the can lifter to rise, the entire tier of cans engaged by the vacuum cups being carried upwardly therewith. The upward travel of the lifter is similarly halted as soon as this is clear of the accumulator 11, the lifter now being manually propelled to the left along the track 108 until the guide plates 166 pass between the angle posts 104 and the latches 171 snap in place to correctly position the lifter 110 with the tier of cans carried thereby superimposed over the pallet 185. The operator then manipulates switch 180 to lower the lifter 110 until the tier of cans 13 carried thereby rest on the pallet 185 as shown in Figs. 1 and 3. He then pulls the handle 152, breaking the vacuum in the cups 140 and disengaging the latches 171 from the angle post 14, thus completing a cycle of operation of the lifter 110 and readying it for immediately commencing a second cycle like that above described.

It should be noted that the depression of pedal 57 is temporary and that the operator removes his foot from this, permitting it to rise as soon as the lifter 110 in its upward travel when lifting a tier of cans from the accumulator 11 has cleared the latter. This returns the end wall 80 to its inward position and starts the conveyer 39 thereby resuming the delivery of cans to the guide ways 73 and the accumulating of a full set of eight of these cans in each of these guide ways, thereby forming another tier in the accumulator ready to be carried away by the lifter 110 and deposited on top of the tier of cans previously lowered onto the pallet 185.

Adjacent layers of cans thus delivered to the pallet 185 are preferably separated by a sheet of kraft paper loosely placed therebetween and binding together the cans in adjacent tiers, thereby preventing the columns formed by outside cans superimposed directly above each other on the pallet 185 from toppling over.

When a sufficient number of tiers of cans 13 have been delivered onto the pallet 185 to properly load this, a fork truck approaches the pallet from between the posts 104, lifts the loaded pallet and carries this away to storage, where loaded pallets are stacked up on top of each other as high as the truck can reach. While the apparatus 10 has been shown and described herein as employed in the palletizing of cans delivered from a processing machine 14, it is to be understood that this apparatus may be used for palletizing cans received from any source and that the lifter 110 may be employed for unstacking palletized cans by merely reversing the stacking process above described and providing a conveyer similar to conveyer 39 and located in the same relation to the lifter 110 as occupied by the accumulator 11, which conveyer has an open upper surface similar to conveyer 39, leading away from the lifter 110 so that the latter may be readily employed to lift tiers of cans successively from a pallet loaded with cans and deliver these tiers onto said conveyer positioned for receiving the same which would then carry these cans away to any point where it is desired to deliver the same, as for labeling or for bulk storage in cars or boats for shipment to a distant warehouse where the labeling will take place. When employing the lifter 110 for lifting a tier of cans from a pallet loaded with the same and delivering this tier onto a conveyer, as above described, it is, of course, necessary to reverse the three-way valve 141 so that this lies on the opposite side of the rod 151 whereby the valve operating lever 142 will be actuated to connect the vacuum cups 140 with the vacuum supply when arm 151 is pulled by the operator to release the latches 171. This modification is necessary in order to pick up a tier of cans from the pallet after the lifter has been lowered into correct superimposed relation with said tier produced by the engagement of the latches 171 with angle iron legs 104. With the lifter thus related to the uppermost tier of cans on the pallet, the rod 151 is shifted to release the latches 171 so as to free the lifter from its guided relation with angle iron guide members 104 while at the same time causing the lifter to suctionally engage the cans of said tier. The operator is now able, when he energizes the lifting hoist 115 to raise the lifter, to move the lifter 110 away from over the pallet and towards the surface onto which it is desired to deposit the tier of cans carried by the lifter.

While the angle irons 70 are described as shown with wear plates 72 of stainless steel to provide smooth support surfaces for the cans 13 being accumulated, it is to be understood that rods or bars of stainless steel or other material are equally suitable if not preferable in some instances for supporting the cans in the guide ways 73.

It is to be understood that pallets 185 are uniform in size and the number of cans required to form a single layer on the pallet varies with the diameter of the cans. For illustrative purposes, the invention is shown in the drawings as handling cans of such a size that 80 cans comprised in a single eight-by-ten layer will fit onto the pallet 185 and the accumulator 11 and can tier lifter 110 are shown as designed for forming and handling such a tier of cans of this particular size. By a mere change in dimensions and proportions, the accumulator may be modified to handle cans of any other particular desired size and by making corresponding changes in the can tier lifter 110, this may also be modified to transfer from the accumulator 11 to the pallet 185 or from the pallet 185 to any other surface a tier of the cans of said other size.

The claims are:

1. In an apparatus for forming a tier of filled and closed cans in a desired pattern, the combination of: a power conveyer for carrying said cans in upright position in a given direction; guide plates supported over said conveyer and extending downwardly into contact with said cans to align the latter in a series of closely spaced parallel rows, said guide plates terminating at the discharge end of said conveyer; an accumulator including a series of parallel guide ways which are aligned respectively with the rows of cans formed by said guide plates, said accumulator being disposed at the discharge end of said conveyer so that the rows of cans formed by said conveyer are delivered to the respective guide ways of said accumulator; an end wall on said accumulator for limiting the distance cans delivered by said conveyer to said accumulator may be pushed along said guide ways for transversely aligning corresponding cans delivered to said guide ways; and coordinately operating means for halting said conveyor and shifting said end wall horizontally away from the cans directly contacting this to free a tier of cans formed in said accumulator to permit this to be lifted upwardly as a unit.

2. In an apparatus for palletizing cans the combination of: an accumulator for receiving cans and forming the same into a tier of cans disposed horizontally and comprising a series of parallel rows of said cans, said tier being formed on a level located a substantial distance above the floor with the space over said tier free of impediment; a pallet jig fixed on the floor for giving a pallet a definite position when said pallet is moved into conformity with said jig; a pair of vertical guide members disposed close to said jig and in spaced relation; an overhead track extending over said jig and said accumulator; a carriage travelling on said track; power actuated suspension means provided on said carriage; a can tier lifter suspended on said suspension means; handle means on said tier lifter for manipulating the same; latch means on said tier lifter adapted to latch onto said vertical guide members when said lifter is brought into correct superimposed relation with a pallet in said jig, while permitting vertical movement of said lifter along said guide members; manual control means on said vertically movable lifter for governing said vertical movement by controlling said power driven suspension means; and means on said tier lifter for rendering the same effective when lowered onto a tier of cans on said accumulator to take hold of said cans so that the latter will be lifted with said lifter when said lifter is caused to rise, and operable when said lifter is lowered while latched in vertical alignment with said pallet to release said tier of cans to deposit the same on said pallet.

3. A combination as in claim 2 in which unitary means is provided on said lifter for relaxing said can engaging means to deposit said cans on said pallet and to release said latch means from engagement with said guide members to permit said lifter to be manually shifted away from over said pallet jig and into superimposed relation with said accumulator to perform another tier transferring operation.

4. A combination as in claim 2 in which said accumulator is provided with guide fingers disposed respectively to be engaged by said lifter when the latter is shifted in each of two directions to accurately align said lifter in superimposed relation with a tier of cans on said accumulator so that by lowering said lifter under manual control into engagement with said fingers the operator may insure a uniform relationship in said cans in each of said tiers to said lifter when said tier is lifted from said accumulator by said lifter, which in turn assures that the cans of successive tiers delivered onto said pallet are in correct vertical alignment with each other.

5. A combination as in claim 2 in which said accumulator includes a series of parallel runways along which cans delivered to said accumulator are guided to form said parallel rows; an endwall mounted on said accumulator for engagement by the farthest advanced of the cans in said rows; a power conveyor for delivering cans to said runways; a manual control for concurrently halting said conveyor and shifting said endwall away from said most advanced cans in said runways; guide fingers provided along the outer edge of one of the outermost of said runways of said accumulator; and guide fingers provided on said endwall, said guide fingers serving when said lifter is manipulated into simultaneous engagement therewith, after the shifting of said endwall as aforesaid, to locate said lifter in its proper superimposed relation with the cans of the can tier disposed on said accumulator.

6. A combination as in claim 2 in which said power suspension means comprises a motor driven cable hoist; and manual switch means provided on said lifter for electrically controlling said hoist.

7. A combination as in claim 2 in which said power suspension means comprises a motor driven cable hoist; manual switch means provided on said lifter for electrically controlling said hoist; and linkage pivotally connected to said carriage and to said lifter and adapted to fold when said lifter is lifted by said power suspension means, said linkage operating to prevent rotation of said lifter about a vertical axis relative to said overhead track.

8. A combination as in claim 2 in which said overhead track is supported by a plurality of posts included among which are the aforesaid vertical guide members for relating the can tier lifter to the pallet jig.

9. In an apparatus for handling cans, the combination of: a pallet jig fixed, when in use, on the floor for giving a definite position to a pallet loaded with a series of accurately superimposed tiers of cans when said pallet is moved into conformity with said jig; a pair of vertical guide members disposed close to said jig and in parallel spaced relation; an overhead track a portion of which extends over said jig; a carriage travelling on said track; power actuated suspension means provided on said carriage; a can tier lifter hanging from said suspension means; handle means on said tier lifter for use in manipulating the same; releasable latch means on said tier lifter adapted to latch onto said vertical guide members when said lifter is brought into a precise superimposed relation with a pallet in said jig, said latch means permitting vertical movement of said lifter along said guide members; manual control means on said vertically movable lifter for governing said vertical movement by controlling said power driven suspension means; and can holding means on said tier lifter for rendering the same effective when lowered onto a tier of cans to take hold of said cans so that the latter will be lifted when said lifter is caused to rise, and operable when said lifter is lowered over a surface onto which said cans are to be delivered, to release said tier of cans to deposit the same on said surface.

10. A combination as in claim 9 in which unitary means is provided on said lifter for co-ordinately controlling said can holding means and said latch means.

11. A combination as in claim 10 in which said unitary control means operates, when actuated, to co-ordinately release said latch means and relax said can holding means whereby a tier of cans supported by said lifter is deposited on said pallet and the lifter is freed from said guide members permitting the operator to immediately shift said lifter away from said guide members and along said track while elevating said lifter in the performance of a new cycle of operation.

12. A combination as in claim 9 in which unitary means is provided on said lifter for co-ordinately controlling said can holding means and said latch means, said unitary means being operative, when actuated, to release said latch means, to co-ordinately render said can holding means effective to take hold of a tier of cans engaged by said lifter.

13. In an apparatus for palletizing cans, the combination of: an accumulator for receiving cans and forming the same into a tier of cans disposed horizontally and with the cans of said tier in a pre-determined pattern, and with the space above said tier free of impediment; a pallet jig spaced horizontally from said accumulator for giving a pallet a definite position when said pallet is moved into conformity with said jig; a pair of vertical parallel guide members disposed close to said jig; an overhead track extending over said jig and said accumulator; a carriage traveling on said track; a power actuated cable hoist provided on said carriage; a can tier lifter cable suspended from said hoist; handle means on said tier lifter for manipulating the same; guide engaging means on said tier lifter which engage said vertical guide members when said lifter is shifted horizontally into correct superimposed relation with a pallet on said jig, said engagement maintaining said tier lifter in said relation during vertical movement of said lifter along said guide members; manual control means on said tier lifter for governing said vertical movement by controlling said power actuated hoist; and means on said tier lifter for rendering said lifter effective when lowered onto a tier of cans on said accumulator to take hold of said cans so that the tier will be picked up by said lifter when the latter is caused to rise, and operable when said lifter is lowered; while guided by said guide members in vertical alignment with said pallet, to release said tier of cans to deposit the same on said pallet.

14. In an apparatus for handling cans the combination of: a pallet jig, fixed, when in use, on the floor for giving a definite position to a pallet loaded with a series of accurately superimposed tiers of cans; a pair of vertical guide members disposed close to said jig and in parallel spaced relation; an overhead track, a portion of which extends directly over said jig; a carriage traveling on said track; a power actuated cable hoist provided on said carriage; a can tier lifter cable-suspended from said hoist; handle means on said tier lifter for use in manipulating the same; guide engaging means on said tier lifter which are brought into engagement with said vertical guide members when said lifter is moved horizontally into a precise superimposed relation with a pallet in said jig, said engagement maintaining said lifter in said superimposed relation during vertical movement of said lifter along said guide members; manual control means on said tier lifter for governing said vertical movement by controlling said power actuated hoist; and can holding means on said tier lifter for rendering said lifter effective when lowered onto a tier of cans to take hold of said cans so that the latter will be picked up by said lifter when it is lifted by said hoist, and operable, when said lifter is lowered over a surface onto which said cans are to be delivered, to release said tier of cans to deposit the same on said surface.

15. In a can handling apparatus, the combination of: an overhead rail; a carriage traveling on said rail; a power actuated cable-hoist mounted on said carriage; a can tier lifter cable-suspended from said hoist; means provided on said lifter and disposed in a horizontal plane for picking up a tier of cans onto which said lifter has been lowered; and a system of linkage comprising a plurality of links pivotally connected together at points intermediate the upper and lower ends of said system, upper and lower elements of said system being pivotally connected respectively to said carriage and to said lifter thereby substantially limiting rotation of said lifter relative to said carriage about a vertical axis and permitting travel of said carriage along said rail to be effected by a force applied tangentially to said lifter without causing substantial rotation of the latter.

16. A combination as in claim 15 in which a pair of vertical guide posts are mounted in spaced relation on opposite sides of the vertical plane of said rail whereby said posts are engaged by said lifter to halt the movement of the latter along said rail; means on said lifter for engaging said posts, when said lifter is so halted, to index said lifter in symmetrical relation with said plane; and a jig means mounted to position a pallet, placed therein, directly beneath said lifter with the latter so indexed.

17. A combination as in claim 16 in which said posts are spaced apart a sufficient distance to permit a pallet, empty or loaded, to pass therebetween as when inserting an empty pallet into said jig or removing a loaded pallet therefrom.

18. A combination as in claim 15 in which said linkage system comprises a plurality of pairs of links, each of said pairs including an upper link and a lower link, the links of each of said pairs being pivotally connected together on a horizontal axis, the upper ends of all of said upper links being pivotally connected to said carriage and the lower ends of all of said lower links being pivotally connected to said tier lifter, said links being free to flex about the axes of their pivotal connections with each other and with said carriage and said lifter but preventing substantial rotation of said lifter about a vertical axis relative to said carriage.

19. A combination as in claim 15 in which a pair of guide posts are rigidly mounted in the path of said lifter as the latter travels parallel to said rail while suspended on said carriage; and indexing means provided on said lifter for engaging said guide posts when said lifter travels into contact with the latter to index said lifter in a fixed vertical path while it is being lifted or lowered during the maintenance of its engagement aforesaid with said posts.

20. A combination as in claim 15 in which a pair of guide posts are rigidly mounted in the path of said lifter as the latter travels parallel to said rail while suspended on said carriage; indexing means provided on said lifter for engaging said guide posts when said lifter travels into contact with the latter to index said lifter in a fixed vertical path while it is being lifted or lowered during the maintenance of its engagement aforesaid with said posts; and spring latch means provided on said lifter and operated by movement of said lifter into engagement with said posts, to latch said lifter in engagement with said posts and thus retain said lifter in said fixed vertical path.

21. In a can handling apparatus, the combination of: an overhead rail; a carriage travelling on said rail; a power actuated cable-hoist mounted on said carriage; a can tier lifter cable-suspended from said hoist; means provided on said lifter and disposed in a horizontal plane for picking up a tier of cans onto which said lifter has been lowered; a system of linkage comprising a plurality of links pivotally connected together at points intermediate the upper and lower ends of said system, upper and lower elements of said system being pivotally connected respectively to said carriage and to said lifter thereby substantially limiting rotation of said lifter relative to said carriage about a vertical axis and permitting travel of said carriage along said rail to be effected by a force applied tangentially to said lifter without causing substantial rotation of the latter; and handle means disposed laterally on said lifter for manually applying such a tangential force to said lifter to propel said carriage along said rail.

References Cited in the file of this patent

UNITED STATES PATENTS

| Number | Name | Date |
|---|---|---|
| 829,833 | Bergeron | Aug. 28, 1906 |
| 1,793,595 | Douglass | Feb. 24, 1931 |
| 2,187,842 | Rheinstrom | Jan. 23, 1940 |
| 2,206,279 | Ferguson | July 2, 1940 |
| 2,644,593 | Miller | July 7, 1953 |